United States Patent
Puchta

(10) Patent No.: US 10,192,188 B2
(45) Date of Patent: Jan. 29, 2019

(54) HANDLING OF DANGEROUS GOODS USING IOT DEVICES

(71) Applicant: SAP SE, Walldorf (DE)

(72) Inventor: Markus Puchta, St. Leon-Rot. (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/361,606

(22) Filed: Nov. 28, 2016

(65) Prior Publication Data

US 2018/0151044 A1     May 31, 2018

(51) Int. Cl.
*G06Q 10/08*    (2012.01)

(52) U.S. Cl.
CPC .................................. *G06Q 10/08* (2013.01)

(58) Field of Classification Search
CPC ........... G07C 2009/0092; G06Q 10/08; G06Q 10/06; G06Q 10/0631; G06Q 10/103; G06Q 30/0623; G08B 13/1618; G08B 19/00; G08B 21/02

See application file for complete search history.

(56) References Cited

U.S. PATENT DOCUMENTS

| | | | | |
|---|---|---|---|---|
| 7,187,278 B2* | 3/2007 | Biffar | ..................... | G06Q 10/08 340/426.19 |
| 7,920,961 B2 | 4/2011 | Mandel et al. | | |
| 8,614,633 B1* | 12/2013 | Lear | ..................... | G08B 29/188 114/382 |
| 9,070,275 B1* | 6/2015 | Green | ................... | H04W 4/029 |
| 2016/0094398 A1* | 3/2016 | Choudhury | ............. | H04L 45/42 370/254 |
| 2016/0379464 A1* | 12/2016 | Sedayao | ............ | G08B 21/0275 340/686.6 |

OTHER PUBLICATIONS

Occupational Safety & Health Administration, Rgulations Standard No. 1910.106.*

* cited by examiner

*Primary Examiner* — Brian A Zimmerman
*Assistant Examiner* — Kevin Lau
(74) *Attorney, Agent, or Firm* — Fish & Richardson P.C.

(57) ABSTRACT

Methods, systems, and computer-readable storage media for monitoring dangerous goods based on networked devices including actions of registering a dangerous good with a monitoring system, the dangerous good being associated with a networked device, the networked device including one or more components that provide data associated with the dangerous good, determining at least one rule that is to be applied to handling of the dangerous good, receiving the data associated with the dangerous good, determining that a violation has occurred by comparing the data associated with the dangerous good to the at least one rule, and transmitting a notification to at least one application of a plurality of applications, the notification indicating that the violation has occurred.

18 Claims, 5 Drawing Sheets

HANDLING OF DANGEROUS GOODS USING IOT DEVICES

BACKGROUND

Dangerous goods can include solids, liquids, and/or gases that can be harmful to humans, animals, property, and/or the environment. In some examples, a good by itself might not be dangerous, but when mixed with, or in close proximity to another good, the combination of the goods is dangerous (e.g., two chemicals that are relatively safe individually (chlorine, ammonia), but can be dangerous when combined (chloramine gas)). Such goods can be referred to as constituent goods (e.g., potentially dangerous). Handling of dangerous goods effects all levels of a supply chain, and should meet the requirements of any applicable regulations, or safety rules to prevent harm.

Multiple parties can be stakeholders in the handling of dangerous goods. For example, a manufacturer, a warehouse, a transporter, and/or a logistics service may each handle dangerous goods. As another example, one or more governmental agencies may be interested in protecting lifer, property, and/or the environment, and promulgate rules and regulations for handling, storage, and/or transport of dangerous goods. As another example, emergency services providers (e.g., police, fire, hospital, hazmat) may be required to respond to incidents involving dangerous goods.

SUMMARY

Implementations of the present disclosure include computer-implemented methods for monitoring dangerous goods based on networked devices. In some implementations, actions include registering a dangerous good with a monitoring system, the dangerous good being associated with a networked device, the networked device including one or more components that provide data associated with the dangerous good, determining at least one rule that is to be applied to handling of the dangerous good, receiving the data associated with the dangerous good, determining that a violation has occurred by comparing the data associated with the dangerous good to the at least one rule, and transmitting a notification to at least one application of a plurality of applications, the notification indicating that the violation has occurred. Other implementations of this aspect include corresponding systems, apparatus, and computer programs, configured to perform the actions of the methods, encoded on computer storage devices.

These and other implementations can each optionally include one or more of the following features: actions further include transmitting a signal to the networked device in response to the violation, the networked device issuing one or more of an audible alarm and visual alarm in response to the signal; actions further include transmitting a signal to another networked device in response to the violation, the other networked device being proximate to the networked device and issuing one or more of an audible alarm and visual alarm in response to the signal; the monitoring system includes a plurality of product check objects, each product check object being associated with a respective networked device of a plurality of networked devices, and processing one or more rules associated with respective dangerous goods to determine respective violations; the networked device is attached to one of the dangerous good, a collective package, within which the dangerous good is contained, a logistics component; and the logistics component includes one of a car, a truck, a boat, a ship, a plane, a train, a factory, a distribution center, and a storage facility.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
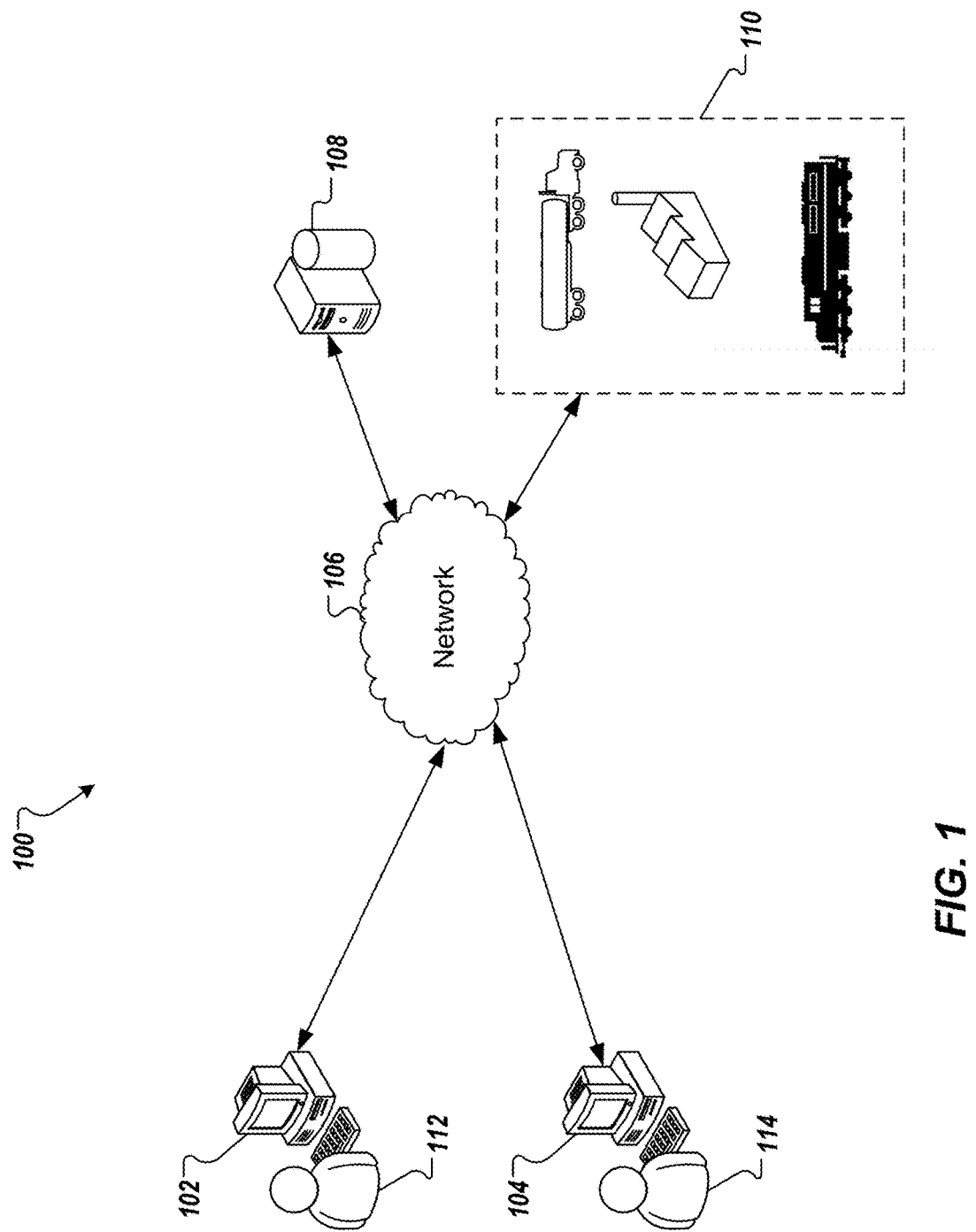
FIG. 1 depicts an example high-level architecture in accordance with implementations of the present disclosure.

Implementations of the present disclosure are generally directed to a platform for monitoring and reporting on dangerous goods, and combining hardware (e.g., networked devices), and cloud-based software to gather, monitor, and provide real-time access and evaluation of data regarding dangerous goods. In some implementations, actions include registering a dangerous good with a monitoring system, the dangerous good being associated with a networked device, the networked device including one or more components that provide data associated with the dangerous good, determining at least one rule that is to be applied to handling of the dangerous good, receiving the data associated with the dangerous good, determining that a violation has occurred by comparing the data associated with the dangerous good to the at least one rule, and transmitting a notification to at least one application of a plurality of applications, the notification indicating that the violation has occurred.

As introduced above, dangerous goods can include solids, liquids, and/or gases that can harmful to humans, animals, property, and/or the environment. In some examples, a good by itself might not be dangerous, but when mixed with, or in close proximity to another good, the combination of the goods is dangerous (e.g., two chemicals that are relatively safe individually (chlorine, ammonia), but can be dangerous when combined (chloramine gas)). Such goods can be referred to as constituent goods (e.g., potentially dangerous). Dangerous goods, and constituent goods can be collectively referred to as dangerous goods.

Handling of dangerous goods effects all levels of a supply chain, and should meet the requirements of any applicable regulations, or safety rules to prevent harm. Multiple parties can be stakeholders in the handling of dangerous goods. For example, a manufacturer, a warehouse, a transporter, and/or a logistics service may each handle dangerous goods. In some examples, a handler monitors the security of dangerous goods by storing and transporting dangerous goods in an appropriate manner. Monitoring can include determining whether safety procedures, laws, and/or regulations are being adhered to. For example, a violation may lead to risk of critical accidents, or high financial risks (e.g., insurance costs, governmental fines). As described in further detail herein, violations can be prevented with real-time access to, and a detailed view on data related to the handling of dangerous goods using implementations of the present disclosure.

Another example stakeholder can include a governmental agency that is interested in protecting life, property, and/or the environment, and promulgates rules and/or regulations for handling, storage, and/or transport of dangerous goods. For example, a government agency may be tasked with protecting persons and/or property in their region (e.g., city, county, state, province, country), and can do so be by defining rules and/or laws, and enforcing such rules/laws. As described in further detail herein, rules/laws can be more effectively promulgated, and monitoring for violations can be improved with real-time access to, and a detailed view on data related to the handling of dangerous goods using implementations of the present disclosure.

Other example stakeholders include emergency services providers (e.g., police, fire, hospital, hazmat) that may be required to respond to incidents involving dangerous goods. For example, to be prepared for potential accidents, it is helpful for emergency service providers to have real-time access to, and a detailed view on data related to the handling of dangerous goods using implementations of the present disclosure. In this manner, emergency service providers can be prepared (e.g., conduct training on specific materials in their localities). For example, in the case of accidents, information on the dangerous goods involved to be available about the risk to perform emergency service tasks. This is not only relevant for emergency service providers that are internal to the entity handling the dangerous goods (e.g., a fire department of a manufacturing plant), but also for external emergency service providers (e.g., local fire departments, hospitals, etc.).

Accordingly, and as described in further detail herein, implementations of the present disclosure provide a platform for monitoring and reporting on dangerous goods. More specifically, implementations of the present disclosure combine hardware (e.g., Internet-of-Things (IOT) devices), and cloud-based software to gather, monitor, and provide real-time access and evaluation of data regarding dangerous goods.

FIG. 1 depicts an example architecture 100 in accordance with implementations of the present disclosure. In the depicted example, the example architecture 100 includes one or more client devices 102, 104, a network 106, a server system 108, and logistics components 110. The server system 108 includes one or more server devices and databases (e.g., processors, memory). In the depicted example, respective users 112, 114 interact with the client devices 102, 104. In an example context, the users 112, 114 can include users (e.g., transportation service provider, government agent, emergency service provider), who interacts with one or more applications hosted by the server system 108.

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, an augmented/virtual reality device, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In some implementations, the logistics components 110 references a collection of supply chain vehicles and/or facilities for manufacturing, storing, and/or shipping goods including dangerous goods. Example vehicles can include, without limitation, cars, trucks, boats, ships, planes, and trains. Example facilities can include, without limitation, factories, distribution centers, and storage facilities.

As introduced above, and described in further detail herein, implementations of the present disclosure provide a platform for monitoring and reporting on dangerous goods, and combine hardware (e.g., IOT devices), and cloud-based software to gather, monitor, and provide real-time access and evaluation of data regarding dangerous goods. In accordance with implementations of the present disclosure, a dangerous good can be associated with a device (referred to herein as a chip), which can be affixed to packaging of the dangerous good (e.g., box, vessel, container, crate). In some implementations, each chip stores data regarding the respective dangerous good, and can provide data regarding the respective dangerous goods. In some examples, data regarding dangerous goods is compared to one or more rules to determine whether a violation exists. Example rules can include, without limitation, a quantity of a product to be stored at one place is restricted for different categories (e.g., flammable products), environmental temperatures cannot exceed respective threshold temperatures for temperature-sensitive products (e.g., explosives have a maximum allowed environment temperature), particular products cannot be stored within a defined proximity, if there could be a harmful reaction (e.g., explosives and an ignition source must be stored at least X meters away from one another), and particular product cannot travel through a tunnel (e.g., route determination is dependent on the product). In some examples, rules are provided based on one or more regulations that may be applicable to particular products and/or localities. In some examples, if a violation exists an event and/or an alert is provided, and a notification is transmitted to one or more stakeholders.

Figure 2:
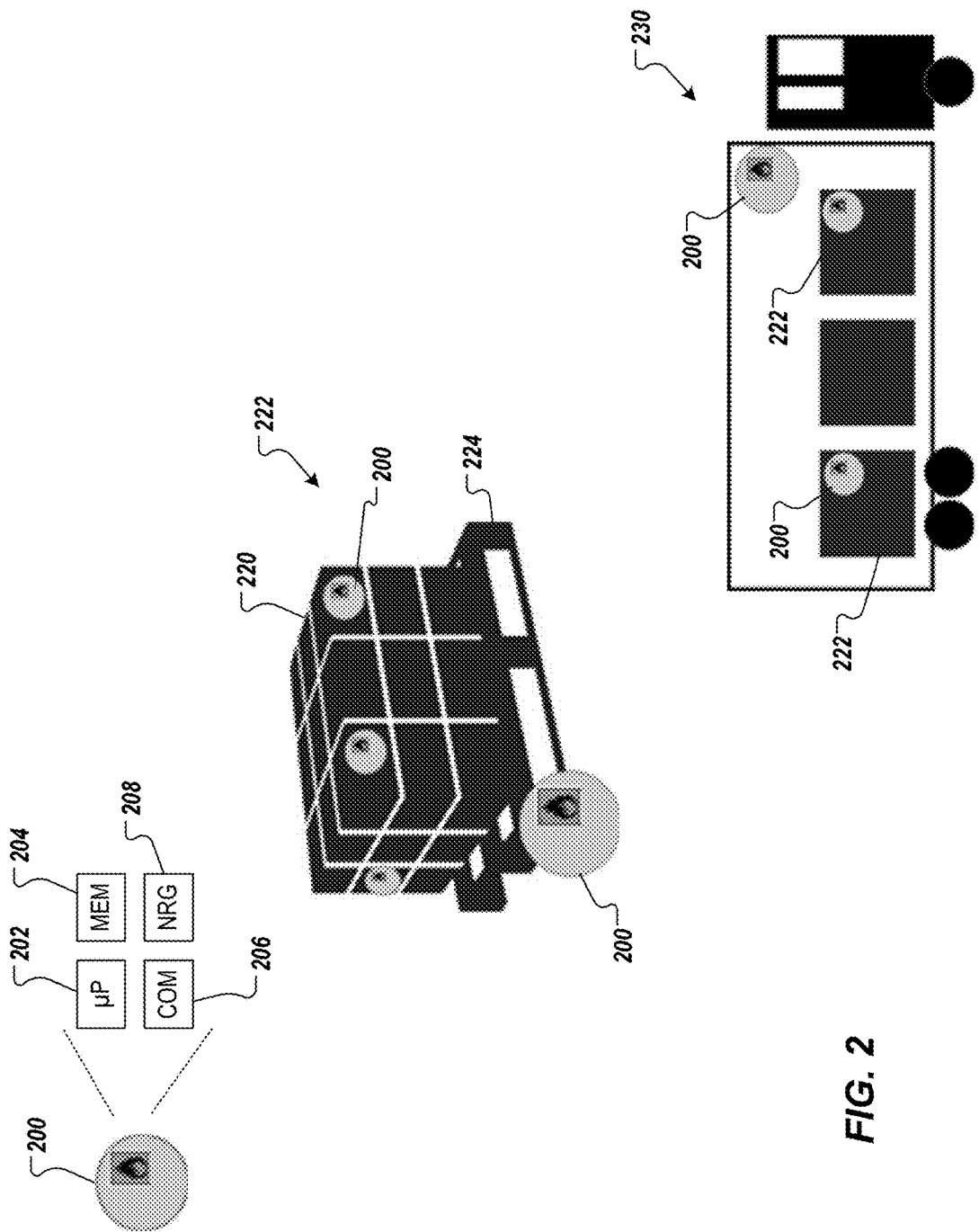
FIG. 2 depicts example applications of chips in accordance with implementations of the present disclosure.

FIG. 2 depicts example applications of chips in accordance with implementations of the present disclosure. In the depicted example, a chip 200 includes a processor 202, readable/writable memory 204, communications components 206, and a power source 208 (e.g., battery). It is contemplated that the chip 200 can include any appropriate component whether explicitly referenced herein. For example, the chip can include a global positioning system (GPS) component to determine geographic location, and/or can include one or more environmental sensors (e.g., pressure, temperature, moisture, accelerometer, tilt sensor).

In some examples, the processor 202 processes computer-executable instructions (e.g., one or more programs) to perform functionality (e.g., at least a portion of functionality described herein). In some examples, the memory 204 stores the computer-executable instructions, as well as data associated with underlying dangerous goods, described herein. In some examples, the communications components 206 enable data to be transmitted from and received by the chip 200. Example communications components can enable communication using a wireless personal area network (PAN) (e.g., Bluetooth Low Energy (LE)). For example, the chip 200 can communicate with other chips 200, and/or one or more network components (e.g., wireless router).

FIG. 2 also depicts individually packaged dangerous goods 220 provided as an assembled collective package 222 (e.g., for shipping, and/or storage). In the depicted example, the collective package 222 includes a pallet 224. In some examples, each of the dangerous goods 220 includes a respective chip 200 attached thereto. In the depicted example, the pallet 224 includes a chip 200 attached thereto. FIG. 2 also depicts a vehicle 230 (e.g., truck), which can be used to transport a plurality of collective packages 222. In the depicted example, the vehicle 230 includes a chip 200.

In accordance with implementations of the present disclosure, an object is registered with a computer-implemented monitoring service. In some examples, the computer-implemented monitoring service is hosted on one or more server systems (e.g., the server system 108 of FIG. 1). Example objects can include, without limitation, a dangerous good, a collective package, and a logistics component (e.g., car, truck, boat, ship, plane, train, factory, distribution center, storage facility). In some implementations, registration of the object includes providing rules that are to be applied to the object. For example, if the object is a dangerous good, an example rule can include, without limitation, allowable proximities of other dangerous goods (e.g., if the dangerous good is chlorine, ammonia cannot be packaged in the same collective package, or be transported in the same vehicle). As another example, if the object is a transport vehicle, an example rule can include, without limitation, disallowed combinations of dangerous goods to be transported (e.g., if chlorine is to be transported by the transport vehicle, ammonia cannot be concurrently transported by the transport vehicle, and vice-versa).

In some implementations, rules are dependent on the type and quantity of the dangerous good. For example, a dangerous good that is of low enough quantity may pose little to no potential harm. However, the dangerous good in sufficient quantities may pose harm. Consequently, a rule may be applicable to a dangerous good, only if the quantity of the dangerous good exceeds a respective threshold for the respective rule. In some examples, rules are dependent on particular localities (e.g., cities, states, countries). For example, a first city may have a rule for handling a dangerous good, and a second city may have no rules for handling the dangerous good. Consequently, if the dangerous good is located in the first city, the rule is applied to handling of the dangerous good, but, if the dangerous good is located in the second city, no (at least city-level) rules are applied to handling of the dangerous good.

In some implementations, registration of the object includes providing data on a chip associated with the dangerous good. For example, a chip that is attached to a vessel containing a dangerous good can have data associated with the dangerous good stored therein (e.g., product data, quantity stored in memory of the chip), and/or rules that are to be applied to the dangerous good. As another example, a chip that is attached to a transport vehicle transporting one or more dangerous goods can have data associated with the one or more dangerous goods stored thereon (e.g., product data, quantity stored in memory of the chip), and/or rules that are to be applied to the one or more dangerous goods.

In some implementations, each of the chips is registered with the computer-implemented monitoring service. In some examples, each chip includes a unique identifier (unique ID) that uniquely identifies a respective chip amongst a pool of chips. In some examples, each chip directly and/or indirectly communicates with the computer-implemented monitoring service. For example, a chip can communicate with the computer-implemented monitoring service using the chip's communication components, and one or more networks (e.g., the network 106 of FIG. 1). In some examples, chips can communicate with one another using their respective communication components (e.g., the chips forming a mesh network).

In some implementations, each chip can determine its location globally, and/or with respect to one or more other chips. For example, the chip can process location signals (e.g., GPS, WLAN) to determine its geographical location. As another example, the chip can process communication signals from one or more other chips (e.g., over Bluetooth LE) to determine a respective location relative to the one or more other chips (e.g., distance from another chip based on signal strength). In some implementations, each chip communicates information with the cloud (e.g., the monitoring service) and/or other chips. example information includes, without limitation, product information, quantity, environmental data (e.g., pressure, temperature, etc.), and location.

In some implementations, one or more applications are registered with the computer-implemented monitoring service. Example applications can include, without limitation, a mobile application (e.g., application executing on a smartphone or tablet), enterprise-level monitoring application (e.g., a supply-chain application used by an enterprise), an emergency services application (e.g., a computer application used by an emergency services provider), and a government-level application (e.g., a computer application used by a government agency). In some implementations, each application is registered to received event information (described in further detail herein) in response to violations of one or more rules.

In some implementations, an application can be provided based on a user role. For example, the driver of a transport vehicle can use an application that reports on vehicle-level information for dangerous goods actually loaded onto a vehicle that the driver is driving. As another example, a supply chain manager of an enterprise can use an application that reports on enterprise-level information for dangerous goods being handled across all logistics components (e.g., vehicles, facilities) of the enterprise. In this manner, although the supply chain manager has a view into handling of dangerous goods their respective enterprise is responsible for, they may be unaware of dangerous goods other enterprises may be handling in or near the same location. As another example, an emergency responder of an emergency service provider can use an application that reports on local-level information for all dangerous goods being handled in their respective locality (e.g., city) by one or more enterprises (e.g., the application reports on dangerous goods regardless of enterprises handling the dangerous goods).

In accordance with implementations of the present disclosure, information provided to/from chips is processed based on one or more rules to determine whether a violation is present. In some examples, information is relayed at regular intervals (e.g., every X milliseconds). In some examples, violations can each be associated with a respective degree indicating severity and/or dangerousness. For example, a first tier violation can indicate that a violation is present, and poses a low risk of harm (e.g., chlorine and ammonia in the same facility, but 100 meters from one another), a second tier violation can indicate that a violation is present, and poses an intermediate risk of harm (e.g., chlorine and ammonia in the same facility, and 10 meters from one another), and a third tier violation can indicate that a violation is present, and poses a high risk of harm (e.g., chlorine and ammonia in the same facility, and less than 1 meter from one another).

In some implementations, if a violation is determined, an event is generated. In some examples, an event includes a data object that stores event data indicative of the event. Example event data can include, without limitation, one or more unique IDs of chips involved in the event (e.g., chips, from which the data that triggered the event was received), one or more rules that were violated, and data (e.g., proximity, environmental, etc.) that triggered the violation.

In some implementations, an event is reported to one or more applications that are registered to receive the event. For example, it can be determined that, for the particular circumstance (e.g., chlorine and ammonia being located too close to one another), an enterprise and/or an agent of the enterprise (e.g., driver, warehouse manager) is alerted to the violation. As another example, it can be determined that, for the particular circumstance (e.g., a dangerous good being transported through the main street of a town), an enterprise, an emergency service provider, and a government agency are each alerted to the violation. In some examples, an application receives relevant event data informing on the status of the event.

In some implementations, if a critical situation is detected (e.g., third tier violation), an alarm can be sounded (e.g., above and beyond reporting the event to the application(s)). In some examples, a local alarm can be triggered (e.g., a fire alarm of a building). In some examples, an alarm can be emitted by a chip (e.g., audible, visible alarm). In some implementations, the alarm is triggered by a chip, the monitoring service, or an application.

In some implementations, one or more forecasts can be provided based on data received from one or more chips. In some examples, the monitoring service and/or one or more registered applications can predict potential for occurrence of a critical situation based on a time-series of received sensor data from one or more chips. In some examples, predictions are provided based on processing of the data using machine learning. For example, an increasing temperature in a time-series is detected, and is determined to be indicative of a critical situation occurring within a threshold time frame, even though the current temperature is below a threshold of a corresponding rule.

Figure 3:
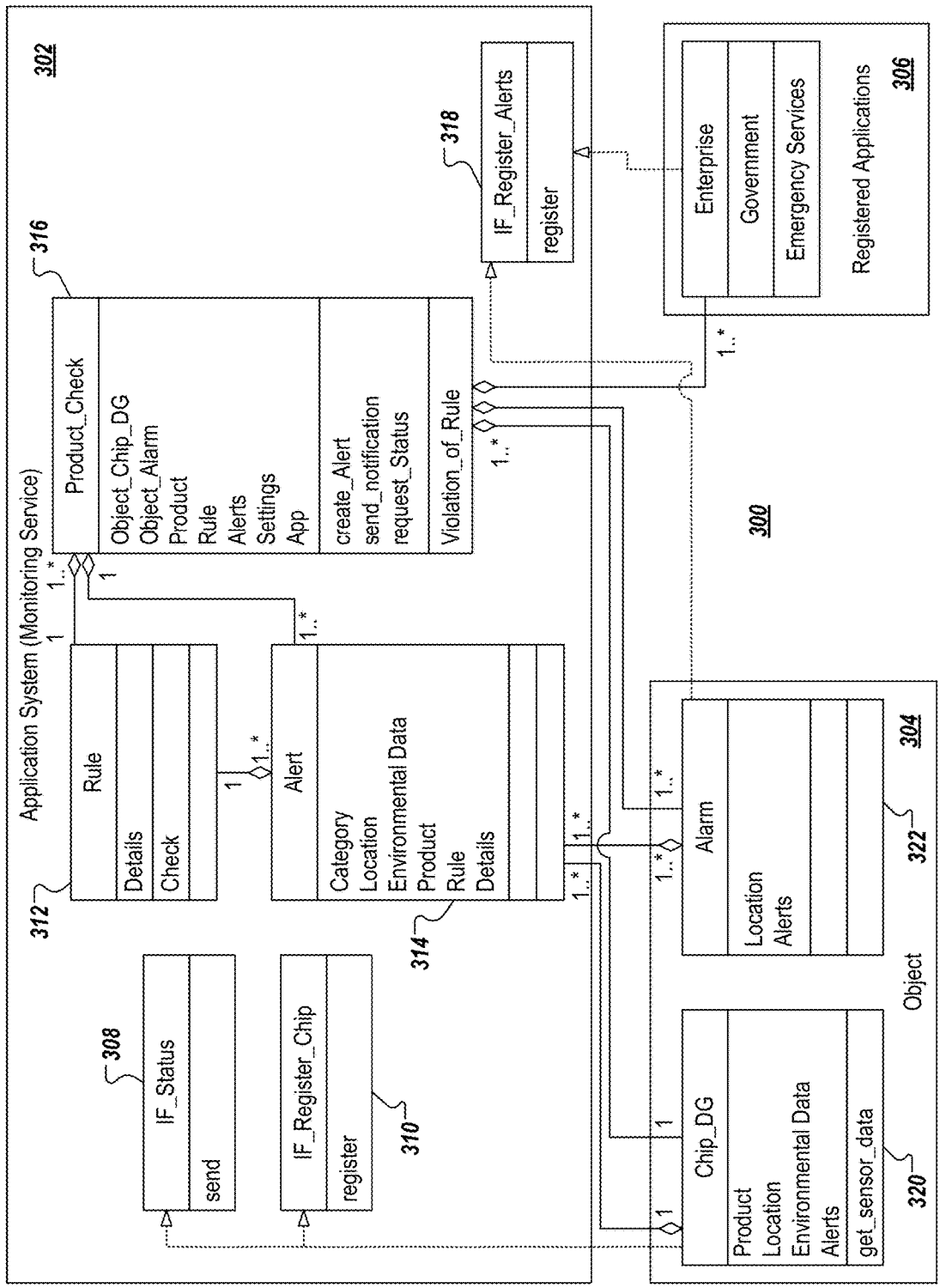
FIG. 3 depicts an example class diagram in accordance with implementations of the present disclosure.

FIG. 3 depicts an example class diagram 300 in accordance with implementations of the present disclosure. The example class diagram 300 depicts, without limitation, example components that can be included in accordance with implementations of the present disclosure. The example class diagram 300 includes an application system 302 (e.g., the computer-implemented monitoring service), an object 304 (e.g., dangerous good), and registered applications 306. The example application system 302 includes a status interface 308, a register interface 310, a rule object 312, an alert object 314, a product check object 316, and an application alert interface 318. The example object 302 includes a chip object 320, and an alarm object 322. The example registered applications 306 includes an enterprise-specific application (e.g., application used by a driver, or a supply chain manager of an enterprise), a government application (e.g., an application used by a government agent), and an emergency services application (e.g., an application used by an emergency responder).

In accordance with implementations of the present disclosure, rules and alerts can be defined in the application system 302. In some examples, for each rule, a rule object 312 is provided, and, for each alert, an alert object 314 is provided. In some implementations, a rule is defined based on a respective rule object 312, and includes a definition of a check that is to be performed, provides threshold values for respective categories (e.g., warnings (first tier), critical situations (second tier), accidents (third tier)). In some examples, settings are provided, which include a period, at which checks are conducted. In some examples, check functionality can be defined within the rule to be able to have a specific check besides generic threshold checks (e.g. the quantity of dangerous goods close by). For example, the temperature should be below 90° C. and it must be below 150° C.

In some implementations, each rule object 312 can correspond to one or more alert objects 314, as indicated by the respective 1 and 1 . . . * notations of FIG. 3. In some examples, each alert object 314 indicates conditions for an alert. In some examples, an alert is provided, if there is a violation of the threshold of a rule. The alert has a category (e.g., warning (first tier), critical situation (second tier, or third tier). The alert is also populated with the object data, which lead to the alert. For example, the temperature increased above the threshold of 90° C., triggering an alert with the category warning.

In some implementations, each product check object 316 is provided as a computer-executable application (e.g., IOT Application) that periodically checks fulfillment of the rules. Thus, all defined rules are connected to the product check object 316. In some examples, the actual status of a chip object 320 is available for the product check object 316. In some examples, if a rule check fails (e.g. the temperature exceeds the threshold of 90° C.), an alert is provided by the product check object 316. Further, a notification is sent to all registered applications 306 to inform the respective users about the alert. The actual status of rule checks, alerts and environmental data of chips can be accessed through the product check object 316 using a registered application 306 (e.g., a supply chain manager can use a registered application 306 to query the product check object 316 as to the status (e.g., location, environmental conditions) of an object 304. In some examples, the product check object 316 also coordinates communication between chips of different categories (e.g., if there is an alert created for a particular chip (on a dangerous good), an alert is provided to a chip of a nearby object (chip of the transport vehicle)).

Each object 304 (e.g., dangerous good, collective package, vehicle, facility) can be registered with the application system 302, and includes the corresponding chip object 320. In some examples, the chip object 320 is provided to retrieve data (e.g., product data, environmental data, location data) relevant to the object 304, which data is provided to the product check object 316. In some examples, if an alert is triggered by the product check object 316, the chip object 320 is informed, and can take follow-up action (e.g., more regular reporting of data). In some examples, each chip object 320 corresponds to one or more alert objects 314. In some examples, one or more alarm objects 322 of the object 304 corresponds to one or more alert objects 314, and/or the product check object 316. In some examples, the alarm object 304 is provided to react to alerts. For example, a condition of a first object triggered an alert (e.g., due to high temperature), and thus, the alarm object of a, nearby second object triggers an alarm (e.g., visual, audible).

In some implementations, each application 306 can be registered with the application system 302. In some examples, one or more of the registered applications 306 is registered to one or more product check objects 316. In this manner, for example, a registered application 306 can be associated with one or more objects 304, and can receive one or more alerts, if handling of the respective objects 304 violates respective rules assigned to the objects 304.

The example class diagram 300 further includes a plurality of interfaces. Example interfaces include, without limitation, the status interface 308, the register interface 310, and the application alert interface 318. In some examples, the status interface 308 is used to define the data that is sent from the chip object 320 to the product check object 316 (e.g., IOT application). In some examples, the register interface 310 is used to register a chip for evaluation of connected rules by the product check object 316. In some examples, the registration provides the connection between the one or more rule objects 312, and the chip object 320. In some examples, the registration also defines chip-to-chip communication that can be conducted through the product check object 316 (e.g., if there is an alert created for a certain chip a close by alert chip is informed). In some examples, the application alert interface 318 is used to register an application 306 to be informed about alerts by the product check object 316, and/or to request an actual status of an object 304 by the product check object 316. In some examples, the registration includes settings, such that involved chips and/or rules can be filtered. For example, an enterprise application 306 is registered for all rule checks of all chips in a particular warehouse.

Figure 4:
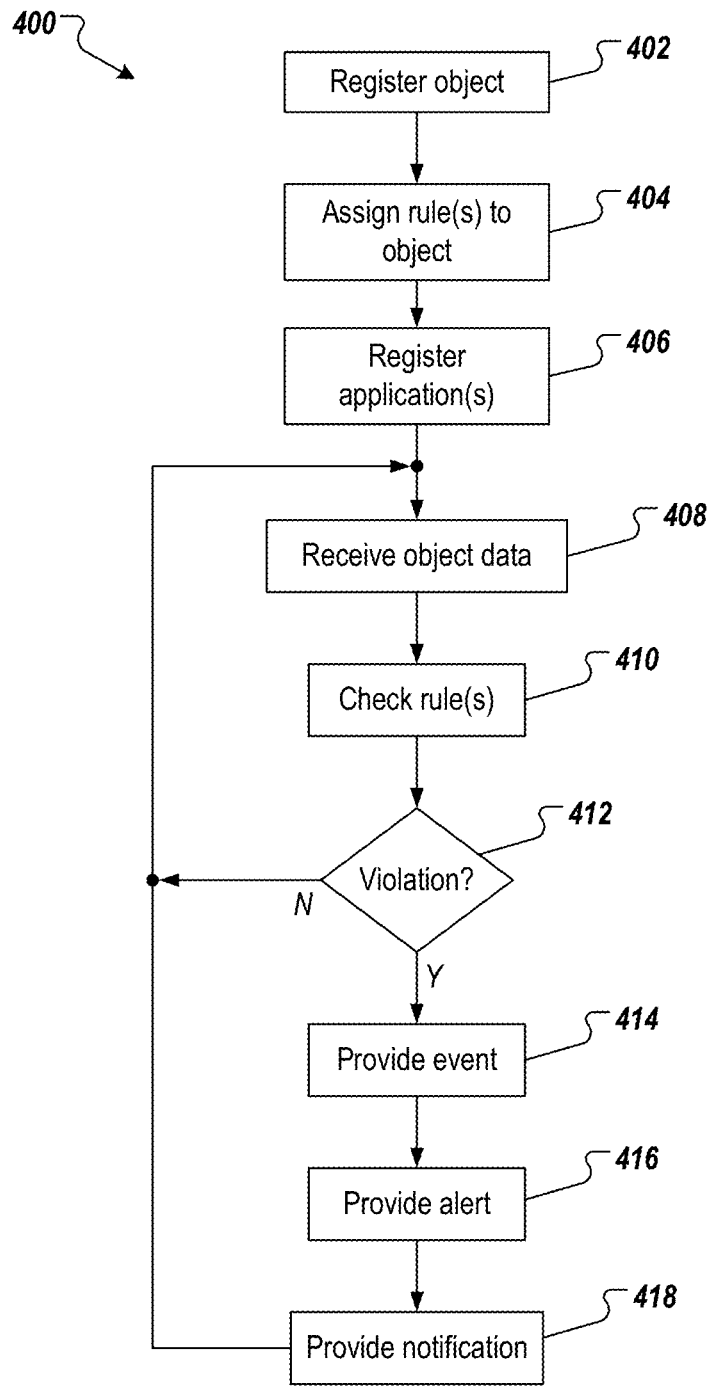
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

An object is registered (402). For example, an object is provided as a dangerous good, and is registered with a monitoring service (e.g., the application system 302 of FIG. 3). The object is associated with a networked device, the networked device including one or more components that provide data associated with the dangerous good (e.g., the chip 200 of FIG. 2). One or more rules are assigned to the object (404). For example, a product check object of the monitoring system is configured to apply one or more rules to the object. One or more applications are registered (406). For example, a user (e.g., stakeholder) seeking to monitor and/or be alerted to violations, registers an application (e.g., mobile app) with one or more product check objects of the monitoring service. In some examples, a product check object associates the object with the networked device, one or more rules, one or more alerts, and one or more registered applications.

Object data is received (408). For example, the monitoring service receives object data from the networked device. One or more rules are checked (410). For example, the object data is processed using one or more rules associated with the object. It is determined whether a violation has occurred (412). For example, it is determined whether the object data indicates a violation of at least one rule of the one or more rules. If a violation has not occurred, the example process 400 loops back. If a violation has occurred, an event is provided (414), an alert is provided (416), at least one notification is provided (418), and the example process 400 loops back. For example, an event providing data indicative of the underlying cause of the violation is generated and stored in the monitoring system, and a notification of the violation is transmitted to at least one registered application.

Figure 5:
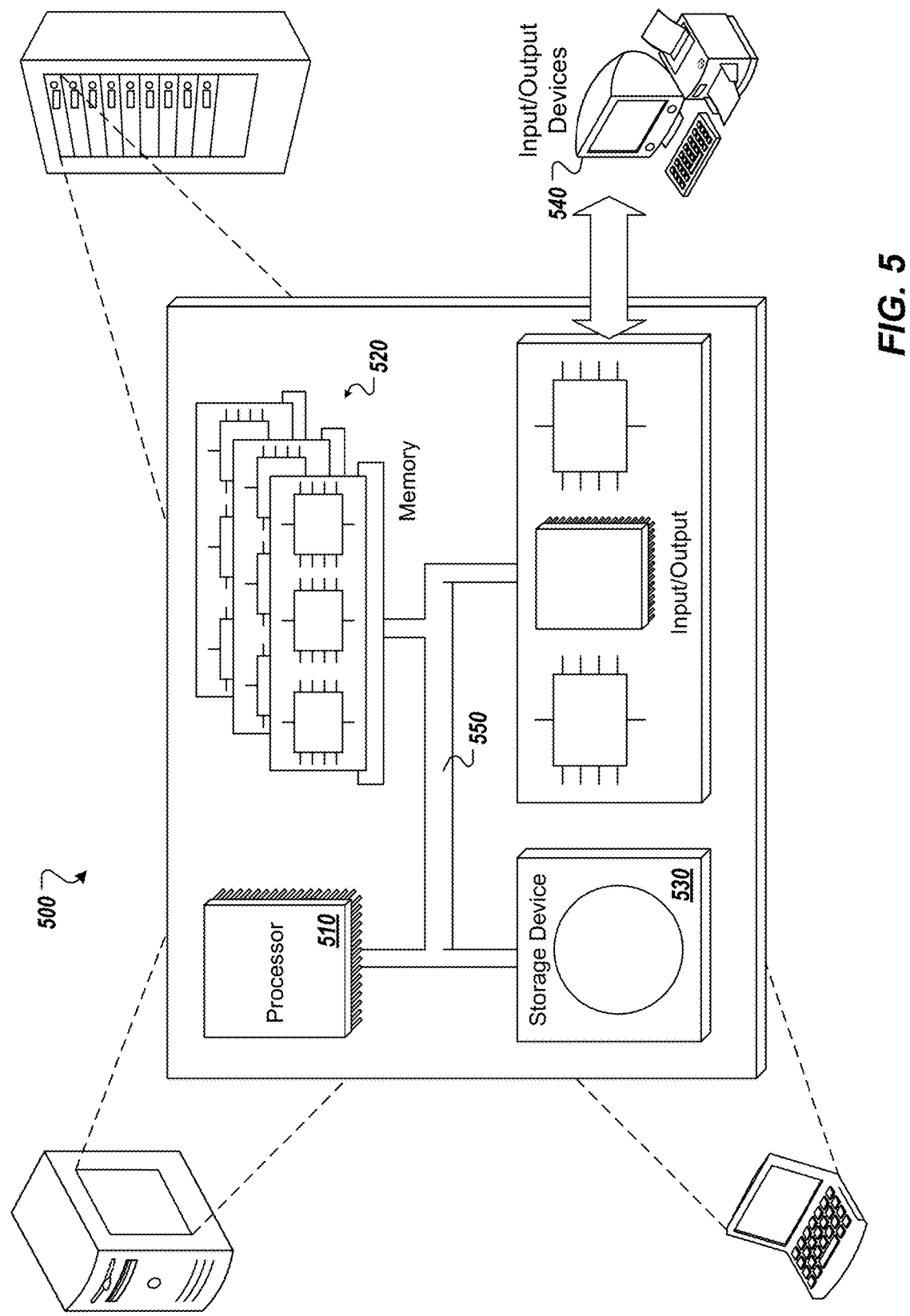
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for monitoring dangerous goods based on networked devices, the method being executed using one or more processors and comprising:

registering, by the one or more processors, a dangerous good with a monitoring system, the dangerous good being associated with a networked device comprising one or more components that provide location data associated with the dangerous good and one or more environmental sensors to provide environmental data in response to environments within which the dangerous good is located, the networked device communicating with one or more other networked devices associated with respective dangerous goods to form a mesh network to determine global locations of the dangerous goods, the environmental data comprising one or more of pressure, temperature, moisture, acceleration, and tilt;

determining, by the one or more processors, at least one rule that is to be applied to handling of the dangerous good to prevent a harm, the at least one rule being dependent on a type and a quantity of the dangerous good, and the global locations;

receiving, by the one or more processors, the location data and the environmental data associated with the dangerous good;

determining, by the one or more processors, that a violation has occurred by comparing the location data and the environmental data associated with the dangerous good to the at least one rule, the violation being associated with a respective degree indicating a severity of the harm based on the type and the quantity of the dangerous good; and transmitting, by the one or more processors, a notification to at least one application of a plurality of applications, the notification indicating that the violation has occurred.

2. The method of claim 1, further comprising transmitting a signal to the networked device in response to the violation, the networked device issuing one or more of an audible alarm and visual alarm in response to the signal.

3. The method of claim 1, further comprising transmitting a signal to another networked device in response to the violation, the other networked device being proximate to the networked device and issuing one or more of an audible alarm and visual alarm in response to the signal.

4. The method of claim 1, wherein the monitoring system comprises a plurality of product check objects, each product check object being associated with a respective networked device of a plurality of networked devices, and processing one or more rules associated with respective dangerous goods to determine respective violations.

5. The method of claim 1, wherein the networked device is attached to one of the dangerous good, a collective package, within which the dangerous good is contained, a logistics component.

6. The method of claim 5, wherein the logistics component comprises one of a car, a truck, a boat, a ship, a plane, a train, a factory, a distribution center, and a storage facility.

7. A non-transitory computer-readable storage medium coupled to one or more processors and having instructions stored thereon which, when executed by the one or more processors, cause the one or more processors to perform operations for monitoring dangerous goods based on networked devices, the operations comprising:
registering a dangerous good with a monitoring system, the dangerous good being associated with a networked device comprising one or more components that provide location data associated with the dangerous good and one or more environmental sensors to provide environmental data in response to environments within which the dangerous good is located, the networked device communicating with one or more other networked devices associated with respective dangerous goods to form a mesh network to determine global locations of the dangerous goods, the environmental data comprising one or more of pressure, temperature, moisture, acceleration, and tilt;
determining at least one rule that is to be applied to handling of the dangerous good to prevent a harm, the at least one rule being dependent on a type and a quantity of the dangerous good, and the global locations;
receiving the location data and the environmental data associated with the dangerous good;
determining that a violation has occurred by comparing the location data and the environmental data associated with the dangerous good to the at least one rule, the violation being associated with a respective degree indicating a severity of the harm based on the type and the quantity of the dangerous good; and
transmitting a notification to at least one application of a plurality of applications, the notification indicating that the violation has occurred.

8. The non-transitory computer-readable storage medium of claim 7, wherein operations further comprise transmitting a signal to the networked device in response to the violation, the networked device issuing one or more of an audible alarm and visual alarm in response to the signal.

9. The non-transitory computer-readable storage medium of claim 7, wherein operations further comprise transmitting a signal to another networked device in response to the violation, the other networked device being proximate to the networked device and issuing one or more of an audible alarm and visual alarm in response to the signal.

10. The non-transitory computer-readable storage medium of claim 7, wherein the monitoring system comprises a plurality of product check objects, each product check object being associated with a respective networked device of a plurality of networked devices, and processing one or more rules associated with respective dangerous goods to determine respective violations.

11. The non-transitory computer-readable storage medium of claim 7, wherein the networked device is attached to one of the dangerous good, a collective package, within which the dangerous good is contained, a logistics component.

12. The non-transitory computer-readable storage medium of claim 11, wherein the logistics component comprises one of a car, a truck, a boat, a ship, a plane, a train, a factory, a distribution center, and a storage facility.

13. A system, comprising:
a computing device; and
a computer-readable storage device coupled to the computing device and having instructions stored thereon which, when executed by the computing device, cause the computing device to perform operations for monitoring dangerous goods based on networked devices, the operations comprising:
registering a dangerous good with a monitoring system, the dangerous good being associated with a networked device comprising one or more components that provide location data associated with the dangerous good and one or more environmental sensors to provide environmental data in response to environments within which the dangerous good is located, the networked device communicating with one or more other networked devices associated with respective dangerous goods to form a mesh network to determine global locations of the dangerous goods, the environmental data comprising one or more of pressure, temperature, moisture, acceleration, and tilt;
determining at least one rule that is to be applied to handling of the dangerous good to prevent a harm, the at least one rule being dependent on a type and a quantity of the dangerous good, and the global locations;
receiving the location data and the environmental data associated with the dangerous good;
determining that a violation has occurred by comparing the location data and the environmental data associated with the dangerous good to the at least one rule, the violation being associated with a respective degree indicating a severity of the harm based on the type and the quantity of the dangerous good; and
transmitting a notification to at least one application of a plurality of applications, the notification indicating that the violation has occurred.

14. The system of claim 13, wherein operations further comprise transmitting a signal to the networked device in response to the violation, the networked device issuing one or more of an audible alarm and visual alarm in response to the signal.

15. The system of claim 13, wherein operations further comprise transmitting a signal to another networked device in response to the violation, the other networked device being proximate to the networked device and issuing one or more of an audible alarm and visual alarm in response to the signal.

16. The system of claim 13, wherein the monitoring system comprises a plurality of product check objects, each product check object being associated with a respective networked device of a plurality of networked devices, and processing one or more rules associated with respective dangerous goods to determine respective violations.

17. The system of claim 13, wherein the networked device is attached to one of the dangerous good, a collective package, within which the dangerous good is contained, a logistics component.

18. The system of claim 17, wherein the logistics component comprises one of a car, a truck, a boat, a ship, a plane, a train, a factory, a distribution center, and a storage facility.

* * * * *